（12） United States Patent
Elms

(10) Patent No.: US 7,486,492 B2
(45) Date of Patent: Feb. 3, 2009

(54) ELECTRICAL SWITCHING APPARATUS INCLUDING A SECOND TRIP CIRCUIT RESPONDING TO FAILURE OF A FIRST TRIP CIRCUIT TO PROVIDE A REPETITIVE SIGNAL

(75) Inventor: Robert T. Elms, Monroeville, PA (US)

(73) Assignee: Eaton Corporation, Cleveland, OH (US)

( * ) Notice: Subject to any disclaimer, the term of this patent is extended or adjusted under 35 U.S.C. 154(b) by 394 days.

(21) Appl. No.: 11/333,918

(22) Filed: Jan. 18, 2006

(65) Prior Publication Data

US 2007/0165342 A1 Jul. 19, 2007

(51) Int. Cl.
*H02H 3/00* (2006.01)
*H02H 9/08* (2006.01)

(52) U.S. Cl. .......................................... 361/45; 361/42
(58) Field of Classification Search ................... 361/45, 361/42
See application file for complete search history.

(56) References Cited

U.S. PATENT DOCUMENTS

| | | | |
|---|---|---|---|
| 3,736,468 A | 5/1973 | Reeves et al. | |
| 4,079,205 A | * 3/1978 | Glenn | ........................ 379/183 |
| 4,081,852 A | 3/1978 | Coley et al. | |
| 4,351,013 A | 9/1982 | Matsko et al. | |
| 4,412,193 A | 10/1983 | Bienwald et al. | |
| 4,539,618 A | 9/1985 | Stich | |
| 4,568,997 A | 2/1986 | Bienwald et al. | |
| 5,202,662 A | 4/1993 | Bienwald et al. | |
| 5,224,006 A | 6/1993 | MacKenzie et al. | |
| 5,260,676 A | 11/1993 | Patel et al. | |
| 5,293,522 A | 3/1994 | Fello et al. | |
| 5,311,392 A | 5/1994 | Kinney et al. | |
| 5,459,630 A | 10/1995 | MacKenzie et al. | |

(Continued)

FOREIGN PATENT DOCUMENTS

EP 0 258 091 A1 3/1988

(Continued)

OTHER PUBLICATIONS

Underwriters Laboratories Inc., Request for Comments on Proposed Requirements for the Third Edition of the Standard for Ground-Fault Circuit-Interrupters UL 943; Proposed Effective Date, May 7, 2004, 10 pp.

(Continued)

*Primary Examiner*—Michael J Sherry
*Assistant Examiner*—Scott Bauer
(74) *Attorney, Agent, or Firm*—Martin J. Moran

(57) ABSTRACT

A receptacle includes separable contacts, an operating mechanism structured to open and close the separable contacts, and two trip circuits. A first microprocessor-based trip circuit includes a first output having a first arc fault/ground fault trip signal, and a second output having a periodic pulsed signal. A second failsafe trip circuit includes an input having the periodic pulsed signal and an output having a second trip signal. The second failsafe trip circuit is structured to output the second trip signal responsive to failure of the first microprocessor-based trip circuit to provide the periodic pulsed signal. A third circuit responds to the first trip signal and the second trip signal and cooperates with the operating mechanism to trip open the separable contacts.

21 Claims, 2 Drawing Sheets

U.S. PATENT DOCUMENTS

| | | | |
|---|---|---|---|
| 5,541,800 A | 7/1996 | Misencik | |
| 5,544,241 A * | 8/1996 | Dibner et al. | 379/373.01 |
| 5,691,869 A | 11/1997 | Engel et al. | |
| 5,822,165 A | 10/1998 | Moran | |
| 5,892,593 A | 4/1999 | Kim | |
| 5,896,262 A | 4/1999 | Rae et al. | |
| 5,963,405 A * | 10/1999 | Engel et al. | 361/42 |
| 5,969,920 A | 10/1999 | MacKenzie | |
| 5,982,593 A | 11/1999 | Kimblin et al. | |
| 6,040,967 A | 3/2000 | DiSalvo | |
| 6,052,265 A | 4/2000 | Zaretsky et al. | |
| 6,262,871 B1 | 7/2001 | Nemir et al. | |
| 6,330,141 B1 | 12/2001 | Elms | |
| 6,392,513 B1 | 5/2002 | Whipple et al. | |
| 6,532,424 B1 * | 3/2003 | Haun et al. | 702/58 |
| 6,697,238 B2 | 2/2004 | Bonilla et al. | |
| 6,707,651 B2 | 3/2004 | Elms et al. | |
| 6,741,442 B1 * | 5/2004 | McNally et al. | 361/166 |
| 6,744,254 B2 | 6/2004 | Clarey et al. | |
| 6,807,035 B1 | 10/2004 | Baldwin et al. | |
| 6,807,036 B2 | 10/2004 | Baldwin | |
| 6,829,124 B2 | 12/2004 | Leopold et al. | |
| 6,867,954 B2 | 3/2005 | Wu et al. | |
| 6,873,158 B2 | 3/2005 | Macbeth | |
| 7,177,129 B2 * | 2/2007 | Arenz et al. | 361/93.1 |
| 2004/0056664 A1 | 3/2004 | Macbeth | |

FOREIGN PATENT DOCUMENTS

WO     WO 03/077396 A1     9/2003

OTHER PUBLICATIONS

Matthew Halverson, "Leaving a Mark", http://www.keepmedia.com/ShowItemDetails.do?itemID=150908&extID=10032&oliID=213, Aug. 1, 2002, 6 pp.

The National Electrical Safety Foundation (NESF), "Electrical Safety Tips", http://www.shermcoindustriesinc.com/shermcoweb/safety1.htm, 2004, 3 pp.

* cited by examiner

ELECTRICAL SWITCHING APPARATUS INCLUDING A SECOND TRIP CIRCUIT RESPONDING TO FAILURE OF A FIRST TRIP CIRCUIT TO PROVIDE A REPETITIVE SIGNAL

BACKGROUND OF THE INVENTION

1. Field of the Invention

This invention pertains generally to electrical switching apparatus and, more particularly, to such apparatus including trip circuits, such as microprocessor-based trip circuits. The invention also relates to arc fault or ground fault circuit interrupters, such as, for example, receptacles.

2. Background Information

Ground fault circuit interrupters (GFCIs) include, for example, ground fault circuit breakers, ground fault receptacles and cord mounted ground fault protection devices. GFCIs and arc fault current interrupters (AFCIs) are well known in the art. Examples of ground fault and arc fault circuit breakers are disclosed in U.S. Pat. Nos. 4,081,852; 5,260,676; 5,293,522; 5,892,593; and 5,896,262.

The U.S. Consumer Product Safety Commission (CPSC) and the circuit protection industry are concerned with AFCI and GFCI devices failing without the consumer knowing that there is no corresponding arc fault or ground fault protection. As AFCI and GFCI safety and protection requirements become relatively more complex, a microprocessor-based solution becomes more necessary. However, the microprocessor, as a result of its complexity, is generally the most likely component of a well-designed electrical switching apparatus to fail, when the other components are not overstressed.

Many AFCI/GFCI manufacturers employ a mechanical lockout approach, but this requires the use of a test button or a trip event. See, for example, U.S. Pat. Nos. 6,040,967 (a resettable GFCI receptacle including a reset lockout mechanism to prevent the resetting of electrical connections between input and output conductors if the circuit interrupting mechanism used to break the connection is non-operational or if an open neutral condition exists); U.S. Pat. No. 6,829,124 (a GFCI is automatically tested for functionality when it is reset, but cannot be reset if the fault circuit interrupter circuitry is not operational); and U.S. Pat. No. 6,867,954 (a reverse wiring protection device for a GFCI cannot be reset when the line and load are miswired). For example, if a failure of the tripping circuit or the sensing circuit is detected, then the corresponding circuit interrupter cannot be closed. This leaves the consumer with a power outage that cannot be corrected without an electrician. This power loss will be a disincentive to test circuit interrupters. Therefore, there is a likelihood that fewer circuit interrupters will be tested and potentially more failed circuit interrupters will remain in the field.

It is known to employ a self test approach using a microprocessor, but this depends upon the very element that is most likely to fail. See, for example, U.S. Pat. Nos. 6,807,035; and 6,807,036.

It is also known to only indicate failure, but not trip. See, for example, U.S. Pat. No. 6,744,254.

It is known to employ a "watchdog" circuit to continually monitor the status of a microcomputer of a circuit breaker. If the "watchdog" circuit fails to receive a pulse signal from the microcomputer at regular intervals, then it attempts to reset the microcomputer. See, for example, U.S. Pat. No. 5,311,392. See, also, U.S. Pat. Nos. 5,822,165; 6,262,871; 6,330,141.

U.S. Pat. No. 4,539,618 discloses a digitally controlled overload relay which monitors current flow in a circuit and triggers an electromagnetic interrupter to open the circuit upon detection of an overcurrent condition. For normal current conditions, a microprocessor generates a train of pulses which is received by the electromagnetic interrupter for maintaining the circuit closed. The pulse train is terminated upon detection of an overcurrent condition.

There is room for improvement in electrical switching apparatus, such as arc fault or ground fault circuit interrupters, and receptacles.

SUMMARY OF THE INVENTION

These needs and others are met by the present invention, which provides an electrical switching apparatus including a first trip circuit and a second trip circuit that monitors the first trip circuit with simple, yet highly reliable circuitry, and if the first trip circuit fails, then a separate trip of the apparatus is initiated.

In accordance with one aspect of the invention, an electrical switching apparatus comprises: separable contacts; an operating mechanism structured to open and close the separable contacts; and a trip mechanism comprising: a first trip circuit including a first output having a first trip signal and a second output having a repetitive signal, a second trip circuit including an input having the repetitive signal and an output having a second trip signal, the second trip circuit being structured to output the second trip signal responsive to failure of the first trip circuit to provide the repetitive signal, and a third circuit responsive to the first trip signal and the second trip signal and cooperating with the operating mechanism to trip open the separable contacts.

The first trip circuit may include a processor structured to provide at least one of arc fault protection and ground fault protection; and the second trip circuit may be structured to detect and provide a protective trip through the second trip signal responsive to failure of the processor and loss of the arc fault protection or the ground fault protection.

The first trip circuit may include a processor; the output of the second trip circuit may be a first output; the trip mechanism may further comprise a power supply structured to power the processor and a power supply monitor including a second output having a third trip signal responsive to failure of the power supply; and the third circuit may be further responsive to the third trip signal to trip open the separable contacts.

The power supply may include a voltage that powers the processor; and the power supply monitor may respond to the failure of the power supply when the voltage is less than a predetermined value.

The third circuit may comprise: a trip coil including a mechanical linkage cooperating with the operating mechanism to trip open the separable contacts, and a drive circuit structured to drive the trip coil, the drive circuit including a first input responsive to the first trip signal and a second input responsive to the second trip signal.

The first trip circuit may include a processor; and the trip mechanism may further comprise a power supply including a voltage structured to power the processor, and a power supply monitor structured to respond to failure of the power supply when the voltage is less than a predetermined value.

As another aspect of the invention, an arc fault or ground fault circuit interrupter comprises: separable contacts; an operating mechanism structured to open and close the separable contacts; a first arc fault or ground fault trip circuit including a first output having a first arc fault or ground fault trip signal and a second output having a repetitive signal; a second trip circuit including an input having the repetitive signal and an output having a second trip signal, the second trip circuit being structured to output the second trip signal responsive to failure of the first trip circuit to provide the repetitive signal; and a third circuit responsive to the first arc fault or ground fault trip signal and the second trip signal and cooperating with the operating mechanism to trip open the separable contacts.

As another aspect of the invention, a receptacle comprises: separable contacts; an operating mechanism structured to open and close the separable contacts; a first trip circuit including a first output having a first trip signal and a second output having a repetitive signal; a second trip circuit including an input having the repetitive signal and an output having a second trip signal, the second trip circuit being structured to output the second trip signal responsive to failure of the first trip circuit to provide the repetitive signal; and a third circuit responsive to the first trip signal and the second trip signal and cooperating with the operating mechanism to trip open the separable contacts.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

The present invention is described in association with an arc fault/ground fault receptacle, although the invention is applicable to a wide range of electrical switching apparatus.

Figure 1:
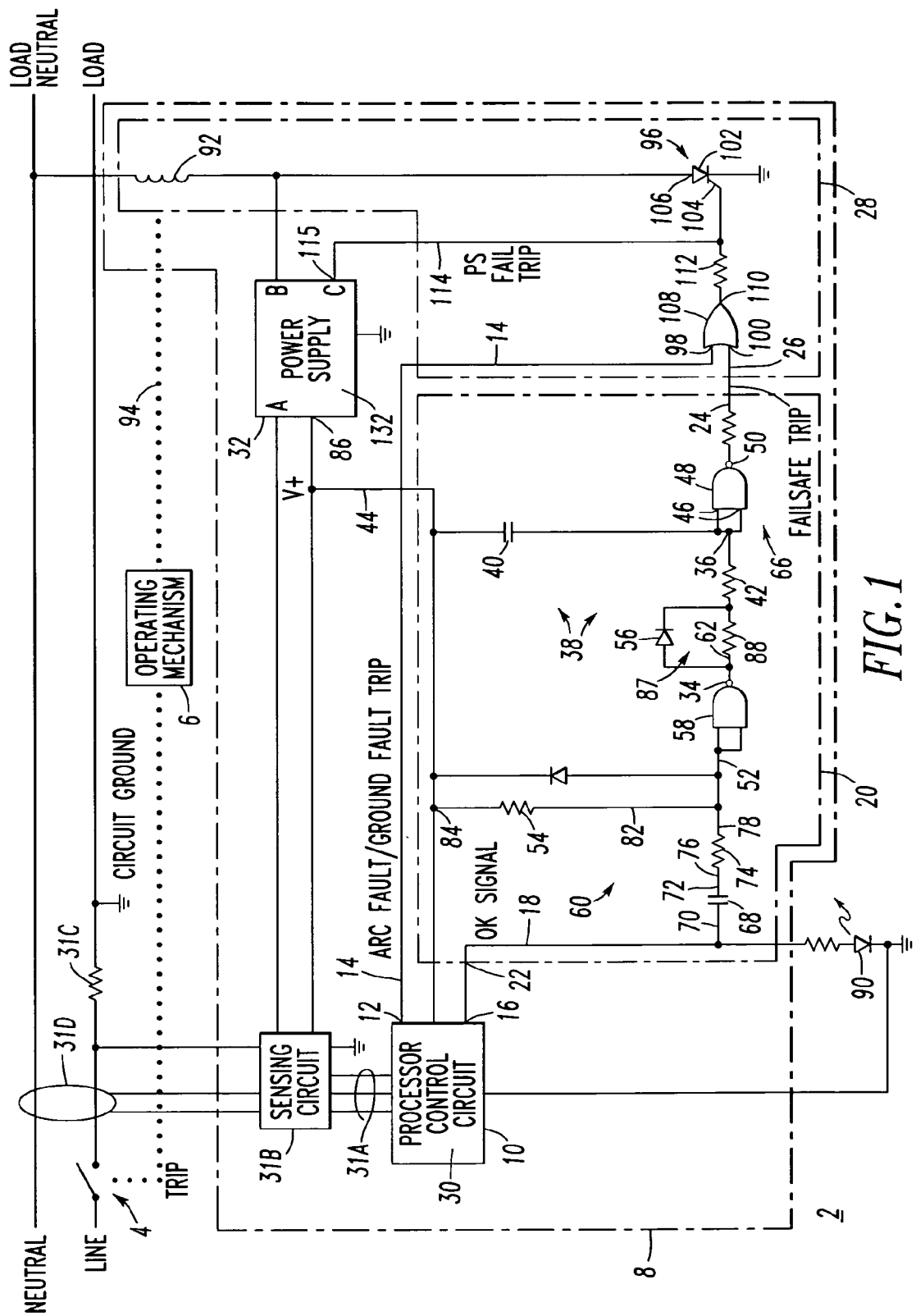
FIG. 1 is a block diagram of an arc fault/ground fault receptacle in accordance with the present invention.

Referring to FIG. 1, an electrical switching apparatus, such as a circuit interrupter, such as the example arc fault/ground fault receptacle 2, includes separable contacts 4, an operating mechanism 6 structured to open and close the separable contacts 4, and a trip mechanism 8. The trip mechanism 8 comprises a first trip circuit 10 including a first output 12 having a first trip signal (e.g., arc fault/ground fault trip) 14 and a second output 16 having a repetitive signal (e.g., OK signal) 18, a second trip circuit 20 including an input 22 having the repetitive signal 18 and an output 24 having a second trip signal 26, a power supply circuit 32 having an output 115 with a third trip signal 114, and a third circuit 28. The second trip circuit 20 is structured to output the second trip signal 26 responsive to failure of the first trip circuit 10 to provide the repetitive signal 18. The third circuit 28 is responsive to the first trip signal 14, the second trip signal 26 and the third trip signal 114, and cooperates with the operating mechanism 6 to trip open the separable contacts 4.

In FIG. 1, the example first trip circuit 10 includes a suitable processor, such as a microprocessor 30, structured to provide arc fault protection and ground fault protection. Non-limiting examples of arc fault detectors are disclosed, for instance, in U.S. Pat. No. 5,224,006, with a preferred type described in U.S. Pat. No. 5,691,869, which is hereby incorporated by reference herein. Non-limiting examples of ground fault detectors are disclosed in U.S. Pat. Nos. 5,293,522; 5,260,676; 4,081,852; and 3,736,468, which are hereby incorporated by reference herein.

The example trip circuit 10 receives arc fault and ground fault related signals 31A from a suitable sensing circuit 31B including a shunt 31C electrically connected in series with the separable contacts 4 and a current transformer 31D.

The example microprocessor 30 may fail in one or more of several manners. For example, it may simply stop functioning, in which case its outputs, such as 12,16, can be left, for example, in a high state or a low state. The microprocessor 30 may also fail as an internal short circuit, thereby loading down the power supply 32. The first trip circuit 10, thus, outputs the repetitive signal 18, such as a periodic waveform. For example, the OK signal 18, as shown, is a periodic pulsed signal, which repeats a pulse having a predetermined pulse width (e.g., without limitation, about 100 ms) about once per second. In other words, under normal conditions, the example OK signal 18 is high for about 100 ms and then is low for about 900 ms, before repeating the example 100 ms pulse and the example 900 ms low period, although any suitable pulse width and/or period may be employed.

The second trip circuit 20 advantageously provides a fail-safe circuit for use with the microprocessor-controlled AFCI/GFCI trip circuit 10. If the OK signal 18 becomes a steady signal (e.g., either high or low) for a predetermined time, such as, for example and without limitation, about two to about three seconds, then the second trip signal 26 is issued by the second trip circuit 20. As will be described, the second trip circuit 20 employs relatively simple, yet highly reliable circuitry to monitor the OK signal 18 (e.g., without limitation, a periodic pulsed waveform) from the microprocessor 30. The second trip circuit 20 detects and provides a protective trip through the second trip signal 26 responsive to failure of the processor 30 and, thus, the loss of arc fault/ground fault protection.

In particular, on every falling edge of the example periodic OK signal 18, the first NAND-gate output 34 goes high for a predetermined time, which charges the common node 36 of the RC circuit 38 formed by capacitor 40 and resistor 42 to the V+ supply voltage 44 (e.g., without limitation, about +5 VDC). As long as the example periodic OK signal 18 occurs often enough (e.g., about once a second), the input 46 of the second NAND-gate 48 does not go below its switching threshold and the second NAND-gate output 50 remains low. Otherwise, if the OK signal 18 becomes a steady (e.g., for a suitable time interval; for about two to about three seconds) high signal or a steady (e.g., for a suitable time interval; for about two to about three seconds) low signal, then the first NAND-gate input 52 becomes high by the pull-up action of resistor 54. Hence, the first NAND-gate output 34 goes low, which drives, through resistors 88, 42, the inputs 46 of the second NAND-gate 48. Then, after capacitor 40 goes low, the second NAND-gate output 50 goes high, which outputs the second trip signal 26 and, thus, causes a trip, as will be explained. Otherwise, when the first NAND-gate output 34 goes high, it charges capacitor 40 through diode 56 and resistor 42, until the second NAND-gate output 50 goes low.

Although two NAND-gates 48, 58 are shown, any suitable Schmitt-trigger inverter may be employed.

Still referring to the second circuit 20 of FIG. 1, an input circuit 60 receives the repetitive signal 18 and outputs an inverted signal 62. The capacitor 40 includes a voltage, and the resistor 42 charges the capacitor 40 with the inverted signal 62. An output circuit 66 receives the voltage from the capacitor 40 and outputs the second trip signal 26, when that voltage is suitably low. The input circuit 60 includes a capacitor 68 having a first terminal 70 receiving the repetitive signal 18 and a second terminal 72. A resistor 74 has a first terminal 76 electrically connected to the second terminal 72 of the capacitor 68 and a second terminal 78. The resistor 54 has a first terminal 82 electrically connected to the second terminal 78 of the resistor 74 and a second terminal 84 electrically connected to the output 86 of the power supply 32. The first inverter input 52 is electrically connected to the first terminal 82 of the resistor 54 and the second terminal 78 of the resistor 74. A circuit 87 includes a resistor 88 electrically connected in series with the resistor 42 and the diode 56 electrically connected in parallel with the resistor 88.

As shown in FIG. 1, the OK signal 18 preferably drives an indicator, such as an LED 90, which gives a visual indication of correct operation. The example periodic pulsed OK signal 18 may be used to flash the LED 90 in an on-off continuous sequence responsive to the OK signal 18; thus, providing a visual indication (e.g., confirmation) of correct operation of the processor 30.

The third circuit 28 includes a trip coil 92 having a mechanical linkage 94 cooperating with the operating mechanism 6 to trip open the separable contacts 4. A drive circuit 96 is structured to drive the trip coil 92. The drive circuit 96 includes a first input 98 responsive to the first trip signal 14 and a second input 100 responsive to the second trip signal 26. The drive circuit 96 includes a silicon controlled rectifier (SCR) 102 having a gate 104 and an anode 106 driving the trip coil 92. An OR gate 108 includes an output 110 driving the SCR gate 104 through resistor 112. The first input 98 is responsive to the first trip signal 14 and the second input 100 is responsive to the second trip signal 26. The output 110 of the OR gate 108 includes a resistor 112 electrically connected to the SCR gate 104.

The trip mechanism 8 further includes the power supply 32 having the voltage 44 structured to power the first trip circuit 10 and, in particular, the microprocessor 30. For example, the power supply voltage 44 may be a nominal voltage of about five volts. Since failure of the power supply 32 may be caused by failure of the microprocessor 30, the power supply voltage V+ 44 may fail and, hence, an alternative trip path is desired.

Figure 2:
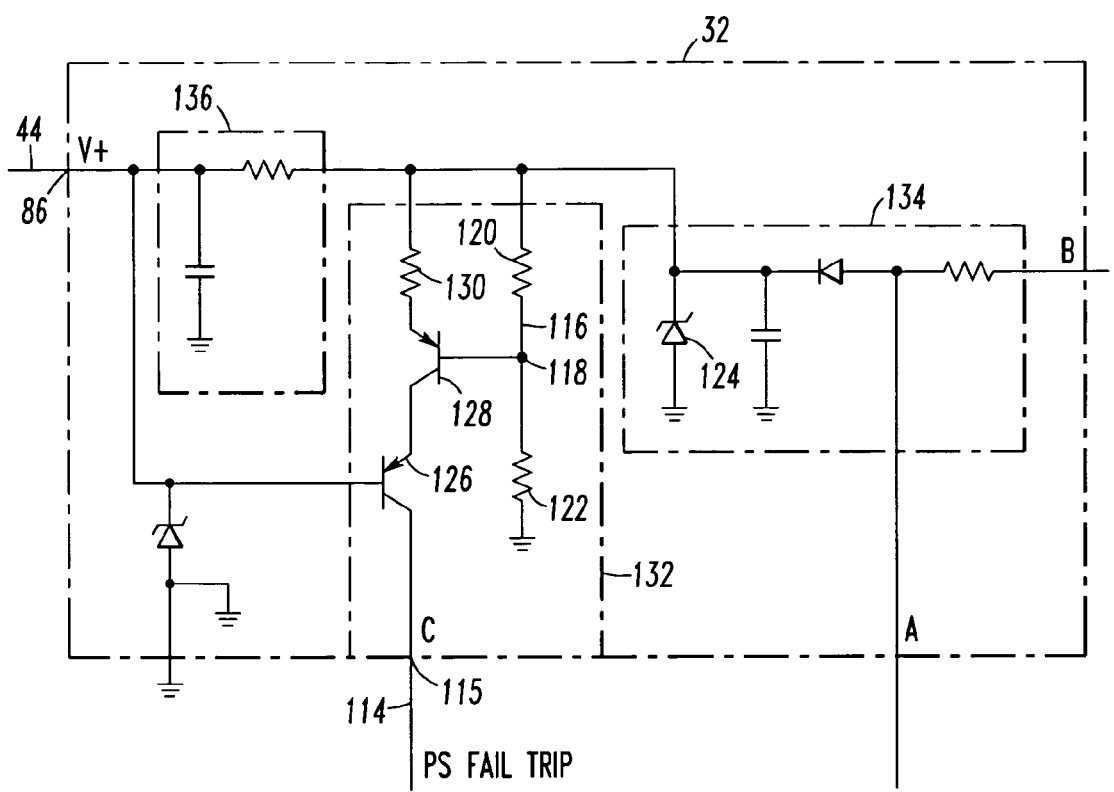
FIG. 2 is a block diagram of the power supply and power supply monitor of FIG. 1.

As is shown in FIG. 2, the power supply 32 is preferably monitored. If the microprocessor 30 of FIG. 1 overloads the power supply 32, then a second trip signal "C" (PS FAIL TRIP) 114 is issued at output 115 to cause a trip. A reference voltage 116 of about 5.4 VDC is set at the common node 118 of the resistors 120,122 when the zener diode 124 is in regulation. If the power supply voltage V+ 44 is set to nominally be 5.0 VDC and it is loaded down, in order that it is about two diode voltage drops less (e.g., about 4.0 VDC), then transistors 126,128 conduct about 700 uA through resistor 130 and cause the trip signal "PS FAIL TRIP" at 114 to trip the SCR 102.

The power supply monitor 132 of FIG. 2 responds to the failure of the power supply 32 when the voltage 44 is less than a predetermined value (e.g., without limitation, about +4 VDC) and responsively drives the SCR gate 104. In particular, the output of the power supply monitor 132 has the trip signal 114 responsive to failure of the power supply 32. In addition to the trip signal 114, the circuit 28 also responds to the trip signal from the output 110 of the OR gate 108 to trip open the separable contacts 4. The signal A from the power supply 32 is employed in the generation of a suitable voltage zero crossing signal (not shown) for the microprocessor 30.

The power supply further includes an input filter and rectifier circuit 134, and an output filter 136.

The example failsafe circuit 20 does not require any user intervention to detect and do a protective trip on loss of protection associated with failure of the microprocessor 30.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. An electrical switching apparatus comprising:
    separable contacts;
    an operating mechanism structured to open and close said separable contacts; and
    a trip mechanism comprising:
        a first trip circuit including a first output having a first trip signal and a second output having a repetitive signal,
        a second trip circuit including an input having said repetitive signal and an output having a second trip signal, said second trip circuit being structured to output said second trip signal responsive to failure of said first trip circuit to provide said repetitive signal, and
        a third circuit responsive to said first trip signal and said second trip signal and cooperating with said operating mechanism to trip open said separable contacts,
    wherein said second trip circuit comprises:
        a fourth circuit receiving said repetitive signal and outputting an inverted signal,
        a capacitor including a voltage,
        a resistor charging said capacitor with said inverted signal, and
        a fifth circuit receiving the voltage from said capacitor and outputting said second trip signal.

2. The electrical switching apparatus of claim 1 wherein said first trip circuit includes a processor structured to provide at least one of arc fault protection and ground fault protection; and wherein said second trip circuit is structured to detect and provide a protective trip through said second trip signal responsive to failure of said processor and loss of said arc fault protection or said ground fault protection.

3. The electrical switching apparatus of claim 1 wherein said first trip circuit includes a processor; wherein the output of said second trip circuit is a first output; wherein said trip mechanism further comprises a power supply structured to power said processor and a power supply monitor including a second output having a third trip signal responsive to failure of said power supply; and wherein said third circuit is further responsive to said third trip signal to trip open said separable contacts.

4. The electrical switching apparatus of claim 3 wherein said power supply includes a voltage that powers said processor; and wherein said power supply monitor responds to said failure of said power supply when said voltage is less than a predetermined value.

5. The electrical switching apparatus of claim 4 wherein said failure of said power supply is caused by failure of said processor.

6. The electrical switching apparatus of claim 1 wherein said third circuit comprises:
    a trip coil including a mechanical linkage cooperating with said operating mechanism to trip open said separable contacts, and
    a drive circuit structured to drive said trip coil, said drive circuit including a first input responsive to said first trip signal and a second input responsive to said second trip signal.

7. The electrical switching apparatus of claim 6 wherein said first trip circuit includes a processor; wherein said trip mechanism further comprises a power supply including a voltage structured to power said first trip circuit, and a power supply monitor structured to respond to failure of said power supply when said voltage is less than a predetermined value; and wherein said drive circuit further includes a silicon controlled rectifier including a gate and an anode driving said trip coil, and an OR gate including an output driving the gate of said silicon controlled rectifier, said first input responsive to said first trip signal and said second input responsive to said second trip signal.

8. The electrical switching apparatus of claim 7 wherein the output of said OR gate includes a resistor electrically connected to the gate of said silicon controlled rectifier; and wherein said power supply includes a voltage that powers said first trip circuit, and a power supply monitor structured to respond to said failure of said power supply and drive the gate of said silicon controlled rectifier when said voltage is less than a predetermined value.

9. The electrical switching apparatus of claim 1 wherein said repetitive signal is a periodic waveform.

10. The electrical switching apparatus of claim 1 wherein said repetitive signal is a periodic pulsed signal, which repeats a pulse having a predetermined pulse width about once per second.

11. The electrical switching apparatus of claim 10 wherein said predetermined pulse width is about 100 milliseconds.

12. The electrical switching apparatus of claim 1 wherein said second trip circuit is structured to output said second trip signal responsive to said repetitive signal having a high state for greater than a first predetermined time or having a low state for greater than a second predetermined time.

13. The electrical switching apparatus of claim 12 wherein at least one of said first predetermined time and said second predetermined time is about two to about three seconds.

14. The electrical switching apparatus of claim 12 wherein said first trip circuit includes a processor; wherein said trip mechanism further comprises a power supply including a voltage structured to power said processor, and a power supply monitor structured to respond to failure of said power supply when said voltage is less than a predetermined value.

15. The electrical switching apparatus of claim 14 wherein said power supply includes a nominal voltage of about five volts; and wherein said predetermined value is about four volts.

16. The electrical switching apparatus of claim 1 wherein both of said fourth and fifth circuits comprise a Schmitt-trigger inverter.

17. The electrical switching apparatus of claim 1 wherein said trip mechanism further comprises a power supply including an output; wherein said capacitor is a first capacitor; wherein said resistor is a first resistor; and wherein said fourth circuit includes a second capacitor having a first terminal receiving said repetitive signal and a second terminal, a second resistor having a first terminal electrically connected to the second terminal of said second capacitor and a second terminal, a third resistor having a first terminal electrically connected to the second terminal of said second resistor and a second terminal electrically connected to the output of said power supply, and an inverter electrically connected to the first terminal of said third resistor and the second terminal of said second resistor.

18. The electrical switching apparatus of claim 1 wherein said resistor is a first resistor; and wherein said second trip circuit further comprises a second resistor electrically connected in series with said first resistor and a diode electrically connected in parallel with said second resistor.

19. The electrical switching apparatus of claim 1 wherein said first trip circuit includes a processor; and wherein said second trip circuit further includes an indicator which is directly responsive to said repetitive signal to indicate correct operation of said processor.

20. An arc fault or ground fault circuit interrupter comprising:
 separable contacts;
 an operating mechanism structured to open and close said separable contacts;
 a first arc fault or ground fault trip circuit including a first output having a first arc fault or ground fault trip signal and a second output having a repetitive signal;
 a second trip circuit including an input having said repetitive signal and an output having a second trip signal, said second trip circuit being structured to output said second trip signal responsive to failure of said first trip circuit to provide said repetitive signal; and
 a third circuit responsive to said first arc fault or ground fault trip signal and said second trip signal and cooperating with said operating mechanism to trip open said separable contacts,
 wherein said second trip circuit comprises:
  a fourth circuit receiving said repetitive signal and outputting an inverted signal,
  a capacitor including a voltage,
  a resistor charging said capacitor with said inverted signal, and
  a fifth circuit receiving the voltage from said capacitor and outputting said second trip signal.

21. A receptacle comprising:
 separable contacts;
 an operating mechanism structured to open and close said separable contacts;
 a first trip circuit including a first output having a first trip signal and a second output having a repetitive signal;
 a second trip circuit including an input having said repetitive signal and an output having a second trip signal, said second trip circuit being structured to output said second trip signal responsive to failure of said first trip circuit to provide said repetitive signal; and
 a third circuit responsive to said first trip signal and said second trip signal and cooperating with said operating mechanism to trip open said separable contacts,
 wherein said second trip circuit comprises:
  a fourth circuit receiving said repetitive signal and outputting an inverted signal,
  a capacitor including a voltage,
  a resistor charging said capacitor with said inverted signal, and
  a fifth circuit receiving the voltage from said capacitor and outputting said second trip signal.

* * * * *